United States Patent [19]

Todd, Jr. et al.

[11] Patent Number: 4,698,684

[45] Date of Patent: Oct. 6, 1987

[54] CATHODOCHROMIC CRT ERASURE AND TUBE SET UP METHOD

[75] Inventors: Lee T. Todd, Jr.; Cornelius J. Starkey, IV, both of Lexington, Ky.

[73] Assignee: Hilliard-Lyons Patent Management, Inc., Louisville, Ky.

[21] Appl. No.: 788,973

[22] Filed: Oct. 18, 1985

[51] Int. Cl.[4] .......................... H04N 3/16; H04N 5/74

[52] U.S. Cl. ....................................... 358/237; 358/64; 358/223

[58] Field of Search ................ 358/230, 231, 236, 237, 358/242, 243, 223, 217, 211, 64, 74; 313/397, 398; 315/369, 364, 370, 13.11; 350/351

[56] References Cited

U.S. PATENT DOCUMENTS

| | | | |
|---|---|---|---|
| 3,959,584 | 5/1976 | Todd, Jr. | 358/236 |
| 3,968,394 | 7/1976 | Todd, Jr. | 313/465 |
| 4,035,525 | 7/1977 | Todd, Jr. | 427/73 |
| 4,202,010 | 5/1980 | Hareng | 358/230 |

FOREIGN PATENT DOCUMENTS

| | | | |
|---|---|---|---|
| 658775 | 4/1979 | U.S.S.R. | 358/223 |

*Primary Examiner*—Tommy P. Chin
*Attorney, Agent, or Firm*—King & Schickli

[57] ABSTRACT

An improved method for erasure of an image target in a CCRT projection system includes the steps of projecting a defocused electron beam onto the target forming a scan line, establishing an energy level below the erase threshold to prevent erasure of any portion of the target within the single line, scanning multiple lines across the full target, and overlapping the scan lines sufficiently to provide integrated heat energy to cause erasure. The energy level is established at about 75% of the erase threshold or about 0.3 joule/cm$^2$. The power is preferably set at 30 kv and 400 microamps with a single scan line being established at 0.056 inch. Preferably, the scan line is set to overlap 5–12 times to cause erasure, with the optimum being approximately 8 overlaps. In the related CCRT set up of the erasure mode, after overlapping the scan lines, the energy level is gradually increased until the integrated heat energy is sufficient to cause erasure. With these parameters established, the desired erasure of the target is assured when needed.

15 Claims, 7 Drawing Figures

Fig. 2 (NEW METHOD)
STEP 1.
DEFOCUSED BEAM; ENERGY ~75 % OF ERASE THRESHOLD OPTIMUM ~56 MILS. LINE. ENERGY: 30 KV, 300 μAMPS.
STEP 2.
SCAN OVERLAPPED LINES (5-12). INCREASE CURRENT TO ~ 400 μAMPS. ERASURE OF FULL TARGET BY HEAT INTEGRATION.
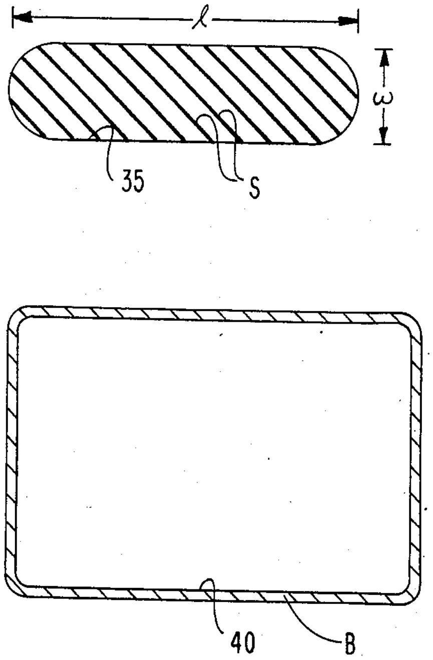
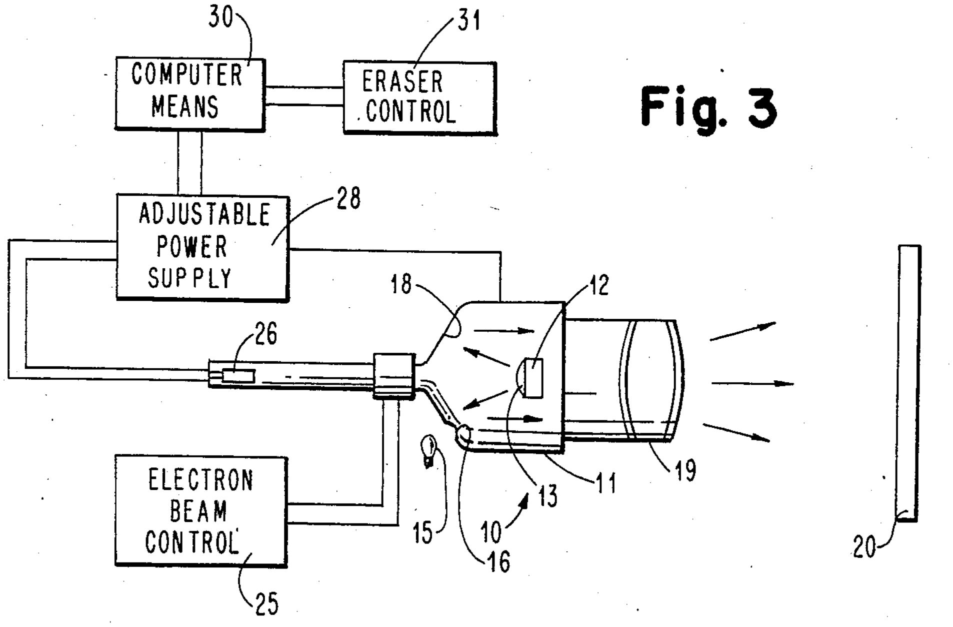
Fig. 3

TARGET ERASURE
WITH BORDER

FULL TARGET ERASURE

CATHODOCHROMIC CRT ERASURE AND TUBE SET UP METHOD

BACKGROUND OF THE INVENTION

The present invention relates to the art of cathodochromic cathode-ray tubes, and more particularly, to an improved method for erasing the target in the tube.

In the field of communications, a new generation of teleconferencing systems is being developed. The heart of these systems is a cathodochromic cathode-ray tube (CCRT) that provides for the first time the answer to the need for an economical, as well as a highly efficient projection display device. With the advent of this system, teleconferencing with a large number of terminals exhibiting high efficiency images is becoming economically feasible.

As explained in the prior art references covering the CCRT projection system, including Todd's prior U.S. Pat. No. 3,968,394, issued July 6, 1976, an electron beam is utilized to generate an image on a phosphor coated target panel inside the tube. A high intensity light source illuminates the panel and the image is reflected by a Schmidt mirror and then projected through a lens unit onto a viewing screen.

One essential feature of making the CCRT system feasible is the ability to efficiently erase the image from the target so that the next image can be written by the electron beam. The erasure procedure must be done quickly in order to allow optimum use of the system. It must also be performed so as to assure a substantially white phosphor surface in order to provide for the desired maximum contrast for the next image. Furthermore, the erasure procedure must not damage the phosphor material and /or the tube components.

The prior art erasure procedure that was developed, as shown graphically in FIG. 1 of the drawings, has been successful. The procedure is one of several key inventions that have allowed the commercialization of the CCRT system.

In the prior procedure or method, the first step is to project a defocused electron beam onto the target, as represented by the shaded target portion in FIG. 1. Next, the beam is focused to raise the energy level, as represented by the heavily shaded area of the target in step 2, but establish the energy level below the erase threshold.

The third step of the prior method requires focusing the electron beam tighter so as to actually cause erasure on the target (as depicted by the blank area of the scan line in step 3.) Because of the scattering of the heat energy, a characteristic color border is formed around the erase line. Typically, the focused erase beam in the prior method is 0.008 inch in width (horizontal thickness) with the color border being approximately 0.001 inch (one mil) wide. In performing step 3, it will be recognized that the erase line requires a relatively high energy density on the target. The step 3 of the procedure is highly tedious since there is a tendency for the erase line to overfocus adjacent the edges of the target. With overfocus causing a change in the width of the scan line by a small amount can result in a considerable increase in the energy. For example, a change in the width by a factor of 2 can result in the increase of the energy density by a factor of 4. With this sharp increase, there is a probability of overheating the phosphor material thereby causing permanent damage to the tube.

In the next step, step 4 of the prior art, there is a requirement for setting up multiple erase lines spaced apart. Each of these lines includes the white area with the peripheral color border, each of which is a total of approximately 8 mils in width. With the spaced lines so positioned, any waviness due to electronic noise can be seen more readily. As will be realized, the waves between the scan lines have the potential of forming gaps in the scan pattern in which case there are spots on the target where the phosphor material is not heated sufficiently for erasure. Thus, when the next image is written and projected, the foreign spot is included. The end result is that the tube must be taken out of service and the set up repeated in an attempt to adjust and remove the wavy portions of the adjacent lines. As will be realized, this step, as well as step 3, is highly tedious and time consuming.

In the fifth step of the prior art, the multiple erase lines are squeezed together until they overlap. The adjacent color borders will merge providing increased heat energy thus effectively causing erasure of the phosphor material at the overlapped borders. During this step 5, any further adjustment of the focus end energy levels is made in order to form a composite erase area. When the erasure is assured, the full target is scanned forming under ideal conditions a full erased, white target with a peripheral color border, as shown in step 5 of FIG. 1.

To our knowledge, there have been no other successful methods of CCRT erasure techniques. Thus, while the prior technique or method developed by Todd is successful, there is a need for improvement. Not only is there a need for a more reliable technique to assure full erasure (while at the same time preventing damage to the phosphor material), but also there is a need for providing a simpler and more reliable related tube set up method.

SUMMARY OF THE INVENTION

Thus, it is one object of the present invention to overcome the foregoing shortcomings of Todd's prior art erasure technique and to provide one that is highly efficient and reliable in its place.

It is another object of the presenst invention to provide an erasure method for a CCRT system that is not susceptible to gaps in the erasure and thus provides an overall smoother erasure.

It is still another object of the present invention to provide an erasure technique for a CCRT system that is not sensitive to wavy erase lines, caused by electronic background noise or the like.

It is still another object of the present invention to provide an erasure technique for a CCRT system that is less susceptible to causing localized burning of the phosphor material.

It is still another object of the invention to provide an erasure method wherein a variation in the beam density is not sufficiently critical to be likely to lead to phosphor damage.

It is another and related object of the present invention to provide a CCRT system set up technique that is less tedious, more accurate and requires substantially less time than Todd's prior method.

Additional objects, advantages and other novel features of the invention will be set forth in part in the description that follows and in part will become apparent to those skilled in the art on examination of the following or may be learned with the practice of the invention. The objects and advantages of the invention may be realized and attained by means of the instrumentalities and combinations particularly pointed out in the appended claims.

To achieve the foregoing and other objects and in accordance with the purposes of the present invention as described herein, a new method to provide erasure of an image target in a CCRT tube is provided. The method in its preferred embodiment is characterized by projecting a defocused electron beam onto the phosphor image layer to form a scan line, establishing the energy level sufficiently below the erase threshold to prevent erasure of any portion within the single scan line, scanning multiple lines across the full target, and overlapping the lines sufficiently to provide integrated heat energy to cause the erasure. This new method allows a build-up of heat energy across each overlapped scan line in order to raise the erasure temperature to the required level of approximately 1 joule/$cm^2$. With the concept of providing a build-up of heat energy with the overlapping scan lines, we find that a much smoother erasure pattern is obtained. There are no gaps in the erasure since every point on the target receives by integration substantially the same amount of energy. Even if there is some background noise in the electronics, the wide stroke electron beam provides the desired full erasure assuring that the phosphor material is white (absent color).

Futhermore, with the concept of multiple scanning with a beam that itself is not sufficient to cause erasure of the phosphor material, the chances of damage are virtually eliminated. Each wide stroke energy beam is at a substantially lower energy density so variation is not critical. This is, the integration effect cancels out high and low beam density areas thus providing an overall desired heating of the phosphor material well within the window allowed. As will be recognized, this procedure allows for tube set up that is much less tedious and that can be performed in a fraction of the time. Indeed, the new set up process can be performed within about 1/6 the time and with a single operator rather than two, as required with Todd's previous method.

In accordance with the preferred embodiment of the invention, the energy level of the electron beam is established at about 75% of the erase threshold. More paraticularly, considering the energy level of 1 joule/$cm^2$ being required to cause erasure, the single scan in the present invention is established at 0.3 joules/$cm^2$. Considering this energy level, and taking into account some loss of heat energy to the target panel between scans, the scan line is set to overlap within the range 5-12 times to cause erasure. Preferably, the scan line is set to overlap 8 times.

The voltage level of the power supply of the CCRT tube system is preferably set at approximately 30 kV and 400 microamps. The range of width of the scan line is selected to be 40-80 mils with the preferred width being 56 mils. Adopting the preferred overlap of 8 times, each scan portion on the phosphor image layer is separated by 7 mils. A color border is formed around the peripheral edge by scanning the full target. In an alternative embodiment, the full target plus an amount over the target dimensions may be scanned to provide full erasure of the desired image area.

In the related method of the present invention for set up of a new cathodochromic cathode-ray tube, we follow the steps of projecting the defocused electron beam onto the target, establishing the energy level below the erase threshold preventing erasure within a single scan line, scanning multiple lines and overlapping the lines, gradually increasing the energy until the integrated heat energy is sufficient to cause erasure, and storing the heat energy parameter so established for recall to effect later erasure of the target. In all more specific aspects of the set up method, the parameters followed for the erasure method are utilized.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawing and descriptions will be regarded as illustrative in nature and not as restrictive.

BRIEF DESCRIPTION OF THE DRAWINGS

The accompanying drawing incorporated in and forming a part of the specification, illustrates several aspects of the present invention, and together with the description serves to explain the principles of the invention. In the drawing:

FIG. 2 is a step by step illustration of our present inventive method showing a section and the full image target, thus illustrating the advanced concepts of the present invention;

FIG. 3 is a schematic diagram of the CCRT system of the present invention showing a cathode-ray tube and a block diagram control circuit;

DETAILED DESCRIPTION OF THE INVENTION

Figure 1:
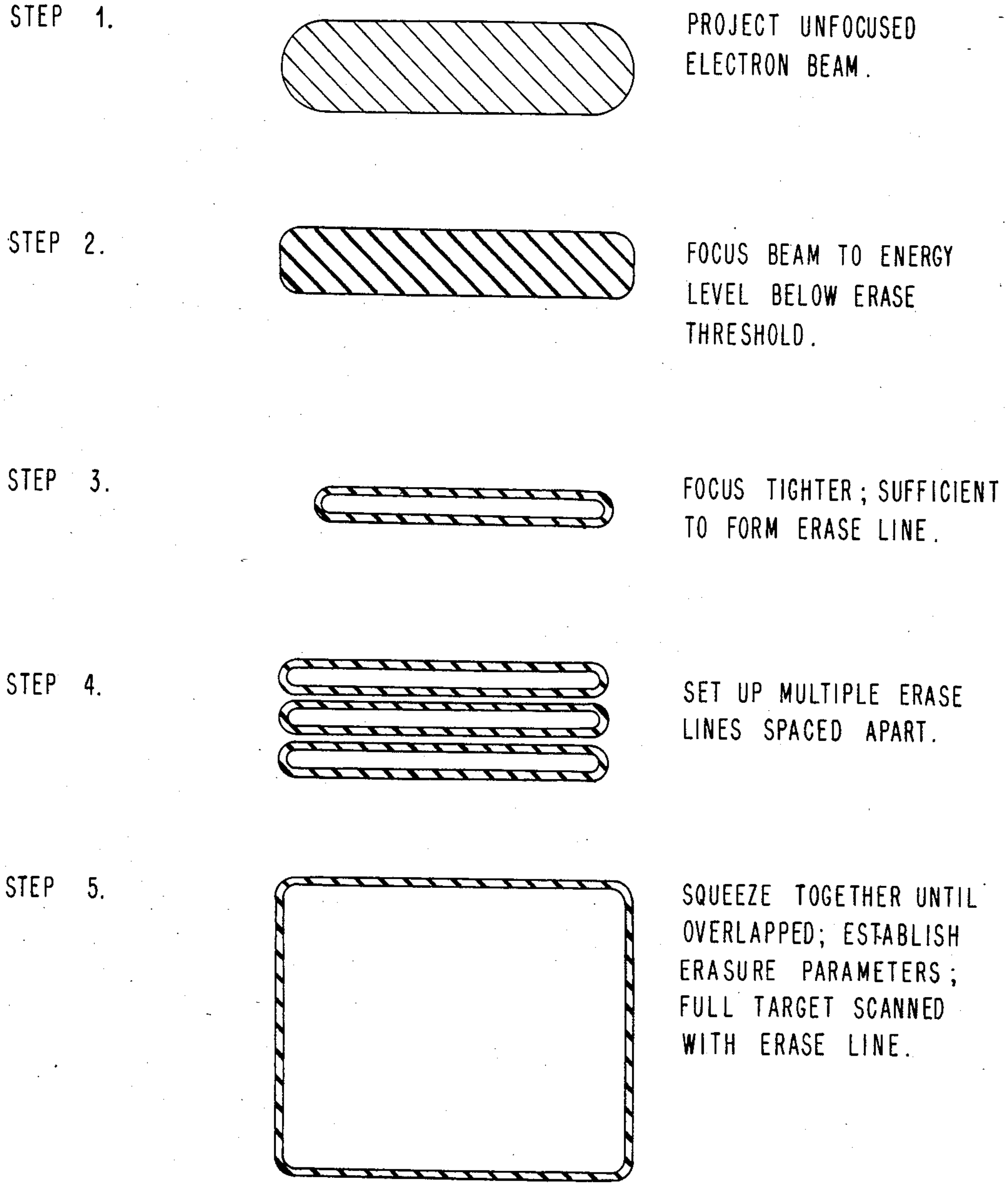
Fig. 1 (PRIOR ART)
FIG. 1 is a step by step illustration of Todd's prior art method with sections and the full image target being shown to illustrate the concept.

Reference can now be made to FIGS. 2 and 3 in order to provide a more detailed description of our improved method. A cathodochromic cathode-ray tube with phosphor material 13, such as a sodalite power, deposited on the face of the target 12 thereof. A high intensity light 15 is positioned to project a light beam through optical port 16 illuminating the image on the target for reflection by a Schmidt mirror 18. The image passes through a lens unit 19 and is projected onto a viewing screen 20.

The system 10 is provided with an electron beam control 25 to control the scan of electrons from electron gun 26. An adjustable power supply 28 provides the necessary beam energy level for performance of the erase technique, as will be seen more in detail later. A computer means 30 with erasure control 31 may be provided for storing the heat energy parameters for recall to effect erasure of the target during operation of the system 10.

In step 1 of FIG. 2, a scan line 35 of the target panel 12 is illustrated. The relatively heavy shading S on the target is representative of the color or darkened condition of the phosphor material 13 when a defocused beam is intercepted. This showing thus depicts projecting a defocused electron beam onto the phosphor image layer of the target and thereby forming a scan line, with a width w. The length l of the scan section or line 35 is preferably the full length of the target.

In accordance with the invention, the electron beam is established at an energy level sufficiently below the erase threshold to prevent erasure of any portion of the target within the single scan line 35. As previously mentioned, this is shown by the diagonal shade lines S at step 1.

In step 2, the method in its broadest terms provides for scanning of multiple lines of the defocused electron beam across the full target and overlapping the scan lines sufficiently to provide integrated heat energy to cause erasure. As shown in step 2 of FIG. 2, erased image area 40 is totally white and ready for receiving the electron beam for writing the next image. Because of the charateristic of the overlapping erase lines, as will be discussed in detail later, a peripheral color border B depicted by the shade lines in FIG. 2 is formed.

Figure 4:
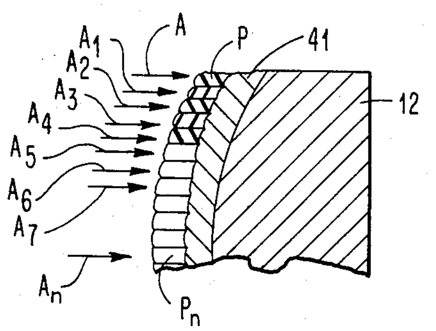
FIG. 4 is an enlarged cross-sectional area of the target panel with the image layer, as well as the buffer layer, of phosphor material shown.

As best shown FIG. 4, the electron beam forming erase line 35 is depicted by scan arrows A—$A_n$ shown directed to the phosphor material 13 of the target. As clearly set forth in Todd's previous U.S. Pat. No. 3,968,394, cited above, the phosphor material includes an image layer P—$P_n$ and a buffer layer 41 deposited on the target panel or substrate 12. As the electrons from the overlapping scan lines 35 bombard the image layer with individual scan portions P—P (depicted by dividing lines) are either not erased, as shown by the shade lined portions, or are erased as shown by the nonshaded portions.

The scanning procedure of the method of the present invention can be understood by noting the arrows A, $A_1$, $A_2$, $A_3$, $A_4$, . . . $A_n$ FIG. 4. Thus, with each scan of a width w, which for example can be represented by arrows A—$A_7$, a section of the image layer is bombarded by electrons. With each successive overlapping scan, the electron beam steps down one arrow, so that for example, on the next scan the first in-line portion P opposite arrow A is not bomarded but the portion opposite arrow $A_1$ is bombarded again along with all of arrows $A_1$—$A_{7+1}$. On the next scan only arrows $A_2$ plus arrows $A_{7+2}$ are bombarded, and so on. In the illustration shown, the heat energy from the first four overlapping scan lines 35 represented by arrows A—$A_3$ may not be sufficient to erase the respective portions P, but each successive scan represented by the arrows $A_4$—$A_n$ is sufficient thereby leaving the remaining portions P white and thus erased. As shown in step 2, the full image area 40 is thus erased, that is P—$P_n$ when the full screen has been scanned.

It has been discovered that the optimum erasure can be obtained by setting the energy level of the beam to about 75% of the erase threshold. In practice, this energy level for operation in a CCRT system as described in Todd's previous U.S. Pat. No. 3,968,394, mentioned above, is set to be approximately 0.3 joules/$cm^2$ where the overlap is within the range of 5–12 times (preferably 8 times). The voltage level is preferably set at 30 kV with erase current at approximately 400 microamps. This can be accomplished by a single adjustment of the adjustable power supply 28 (FIG. 3).

In accordance with an additional feature of the present invention, the width w of each scan line 35 is established within the range of 40–80 mils. Preferably, the width w is approximately 56 mils. Thus in the preferred embodiment, each portion P—$P_n$ is approximately 7 mils in width.

Figure 4A:
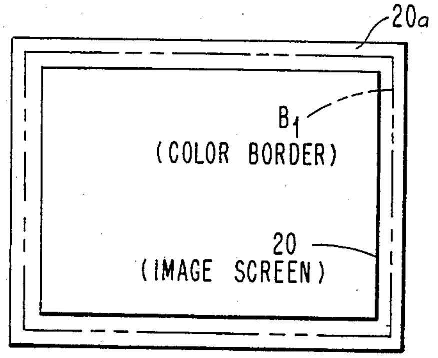
FIG. 4*a* is a frontal view of the viewing screen illustrating a projected image with a color border on the screen frame when utilizing the target panel of FIG. 4.

As shown in FIG. 4a, the image of the erased target is projected to the viewing screen 20. The color border is shown by the projected color border $B_1$. A frame 20a may be provided on the screen 20 in order to receive the color border $B_1$. In such an instance, there is no distraction, and thus no liability in allowing the color border B to remain on the target.

Figure 5:
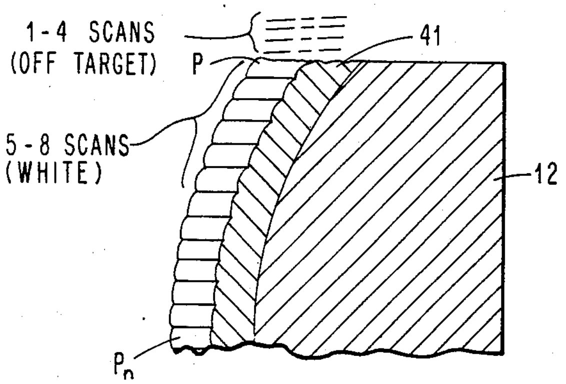
FIG. 5 is an enlarged cross-sectional view of a portion of the target panel in an alternative embodiment of the invention wherein the electron beam scans beyond the periphery of the target panel.
Figure 5A:
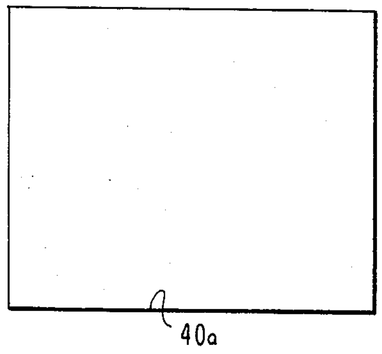
FIG. 5*a* is a frontal view of the target showing a full erased image area provided in accordance with the erasure technique illustrated in FIG. 5.

However, in accordance with an alternative method, as shown in FIGS. 5 and 5a, full target erasure may be effected. In this instance, the required number of initial scans, are projected beyond the peripheral edge of the target 12 so that the very first image layer portion P and all others through $P_n$ are erased. Furthermore, the sweep across the image area extends beyond the side edges and the lower edge so that no border around the full periphery is produced. The image area 40a as shown in FIG. 5a is thus fully erased.

In the related set up method for the cathodochromic CRT tube to establish the erasure mode of the image target, in for example a new tube, the operator follows the erasure step of projecting a defocused beam onto the target, the energy level of the beam is established sufficiently below the erase threshold to prevent erasure, the scan lines are overlapped, the energy is gradually increased until erasure occurs, and then the energy parameters are stored for recall to effect erasure of the target at a later time during operation of the system. The preferred set up method includes the step of establishing the energy level at approximately 75% of the erase energy threshold initially, or at a power setting of 30 kV and 300 microamps. The energy increasing step is performed to bring the current level of the power up to approximately 400 microamps to provide erasure. Also in the method, the process of scanning multiple lines across the target is repeated until full erasure is provided.

In summary, the improved method of erasure and new tube set up method, as depicted in FIG. 2, provides for a build-up of heat energy to gain erasure temperature rather than providing full energy with each scan line. This concept provides improved results and advantages not heretofore obtainable. By providing overlapping erasure lines, a smoother erasure with no gaps is obtained. This is due to the concept of integrating the heat energy over a wide area with the several energy beams overlapping each other assuring roughly the same energy to erase in each area of the target. By use of the lower energy density, the phosphor image layer P is less susceptible to damage due to burning. As such, the related new tube set up method removes the tedious and time consuming process of focusing the electron beam.

The foregoing description of a preferred embodiment of the invention has been presented for purposes of illustration and description. It is not intended to be exhaustive or to limit the invention to the precise form disclosed.

We claim:

1. The method of erasure of an image target in a cathodochromic cathode-ray tube comprising the steps of projecting a defocused electron beam onto a phosphor image layer of said image target thereby forming a single scan line;

establishing an energy level of said defocused electron beam sufficiently below an erase threshold to prevent erasure of any portion of the image target within any single scan line;

scanning multiple lines across the full image target; and overlapping the multiple scan lines sufficiently to provide integrated heat energy along the multiple scan lines of the image target to cause erasure.

2. The method of erasure of claim 1, wherein the energy level of said defocused electron beam is established at about 75% of the erase threshold.

3. The method of erasure of claim 2, wherein the energy level of any single scan line is set at approximately 0.3 joules/$cm^2$.

4. The method of erasure of claim 3, wherein a power supply has a voltage level set at approximately 30 kV and 400 microamps.

5. The method of erasure of claim 1, wherein any single scan line is established within the range of 0.400 to 0.080 inch in width.

6. The method of erasure of claim 5, wherein any single scan line is established at approximately 0.056 inch.

7. The method of erasure of claim 1, wherein said multiple scan lines, are set to overlap within the range of 5-12 times to cause erasure.

8. The method of erasure of claim 7, wherein said multiple scan lines are set to overlap 8 times.

9. The method of erasure of claim 1, wherein the full image target is scanned so that the defocused electron beam terminates approximately along a peripheral edge of the full image target.

10. The method of erasure of claim 9, wherein is provided the step of forming a color border around the peripheral edge by scanning the full image target.

11. The method of erasure of claim 1, wherein the full image target is scanned plus a preselected additional amount so that the full image target is erased.

12. The method for use with a cathodochromic CRT tube for set up of an erasure mode of an image target comprising the steps of projecting a defocused electron beam onto a phosphor image layer of said image target thereby forming a single scan line;

establishing an energy level of said defocused electron beam sufficiently below an erase energy threshold to prevent erasure of any portion of the image target within any single scan line;

scanning multiple lines across the image target;

overlapping the multiple scan lines;

gradually increasing the energy level of the defocused electron beam until an integrated heat energy along the multiple scan lines of the image target is sufficient to cause erasure; and storing a heat energy parameter of the energy level sufficient to cause erasure for recall to effect erasure of the image target.

13. The method of tube set up for erasure of claim 12, wherein the step is performed of establishing the energy level at approximately 75% of the erase energy threshold intitially.

14. The method of tube set up for erasure of claim 13, wherein power driving the defocused electron beam is initially set at 30 kV and 300 microamps and is increased to approximately 400 microamps to provide erasure.

15. The method of tube set up for erasure of claim 12, wherein the step of scanning multiple lines is increased to include the full image target.

* * * * *